Patented June 15, 1954

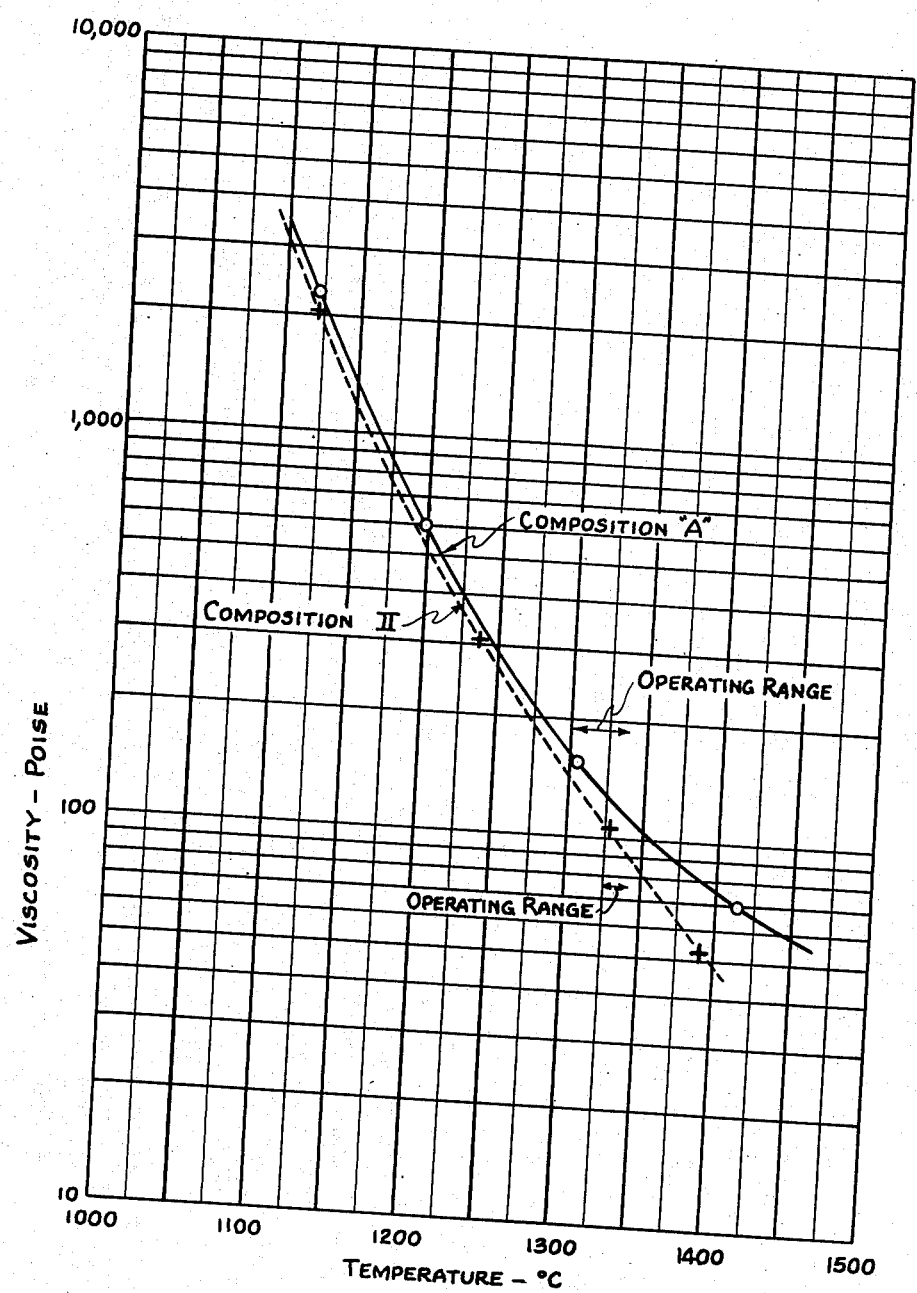

2,681,289

UNITED STATES PATENT OFFICE 2,681,289

GLASS COMPOSITION

Lorenzo D. Moore, Kansas City, Mo., assignor to Gustin-Bacon Manufacturing Company, a corporation of Missouri Application March 4, 1950, Serial No. 147,707

4 Claims. (Cl. 106—50)

This invention relates to glass compositions and it refers more particularly to a composition suitable for the attenuation of glass fibers.

Glass is an amorphous product of fusion, varying widely in composition and having no definite formula but generally comprised of alkaline silicates and the silicates of one or more bases. The elements usually present as a raw material are silica in the form of sand; alkali metals such as sodium and potassium, in the form of oxides or carbonates; alkali earths such as calcium oxide and barium oxide to give a higher index of refraction; and sodium borate or borax to serve as a flux and to decrease the coefficient of expansion. However, good glass compositions have been made which are free of alkali metal oxides by substituting boron oxide, or boric acid to form the borosilicate type glasses.

The requirements of a glass composition which is intended for use in fiber attenuation are different from those of ordinary flint or crown glass used in casting, molding or extrusion processes. In the glass fiber industry the raw material usually is brought to molten state in a refractory furnace capable of withstanding high temperatures and a vigorously corrosive glass melt of the lime-borosilicate type. It is, of course, essential that care be exercised to avoid melting temperatures which are injurious to the furnace refractories; but this has not always been easy in the past, because with many glass compositions it has been necessary to use very high working temperatures to achieve proper viscosity for fining the mass. Adding to the problem is the fact that the glass used as a raw material in the attenuating bushing must be free of stones, bubbles or stringy portions which will result in fiber imperfections or breakage in the drawing process; and again this is difficult to achieve while at the same time meeting the requirement that the molten material must have a viscosity which lends itself to proper working of the mass near the orifices as the fiber is drawn.

One of the important objects of the present invention is to provide as a raw material for fiber attenuation, a glass which is easy to melt and fine at temperatures below those which would be injurious to the furnace or bushing, and which is free of stones, bubbles and stringy portions when at the proper temperature for fiber attenuation.

From past experience it has also been found that in order to produce a glass fiber of sufficient durability it is necessary to use as a raw material a glass of good corrosion resistance. Though common flint or crown glass may be drawn into a fiber, the resultant product is one of poor chemical durability and it is rapidly corroded even by what we consider ordinary atmosphere, air plus water vapor.

Past efforts to produce a good fiber glass composition have resulted in a series of borosilicate compositions, two examples of which are set out below:

Composition I

| | Per cent |
|---|---|
| Silicon dioxide | 54.00 |
| Aluminum oxide | 14.00 |
| Calcium oxide | 17.50 |
| Magnesium oxide | 4.50 |
| Boron oxide | 10.00 |

Composition II

| | Per cent |
|---|---|
| Silicon dioxide | 54.38 |
| Aluminum oxide | 15.35 |
| Calcium oxide | 15.75 |
| Magnesium oxide | 4.91 |
| Boron oxide | 8.90 |
| Difference | .71 |

With these compositions high temperatures are required to melt and fine the material. With respect to fiber production the operating range of temperature over which the molten glass may be attenuated is very small, thereby limiting the temperature range at which a bushing must be maintained to provide the necessary viscosity at the drawing orifices. Thus, it can be seen that a wider range of operating or working temperatures is a desirable feature which is lacking in present glass composition.

Therefore, it is another object of my invention to provide as a raw material for the attenuation of fibers, a glass composition having a viscosity-temperature relationship which lends itself to the working of the molten mass over a wider operating range, favoring lower temperatures.

It is a further object of my invention to provide for the attenuation of fibers a glass composition which will produce a fiber of good corrosion resistance.

Experiments conducted with many glass compositions, which have been mixed, melted and fined, have shown that the oxides of the light metals are unnecessary in appreciable quantities in a suitable material; and that a decrease in the silica content of a glass in favor of alkali earth constituents, and the substitution of boron oxide for the alkali oxide fluxes, produces better properties of corrosion resistance in a glass which is workable over a wider range of temperatures.

To this end it is a feature of my invention that in a glass composition a larger proportion of boron oxide be substituted for the common alkali fluxes and that the silica content of the composition be decreased in favor of the alkali earth constituents.

Briefly my invention comprises the formulation of a glass composition from the elements, silicon dioxide, aluminum oxide, calcium oxide and boron oxide in the following ranges, and the attenuation of fibers therefrom:

|  | Per cent |
|---|---|
| $SiO_2$ | 46–52 |
| $Al_2O_3$ | 14–18 |
| CaO | 18–24 |
| $B_2O_3$ | 9–14 |

These ranges are determined by compounding many batches of glass having their components in the various proportions and determining their fining and working properties.

Since it was found that the oxides of the light metals, such as magnesium oxide, are not essential where the proportions of the remaining elements are those indicated, they have ben eliminated from my composition.

By decreasing the silica content of my composition, as compared to former compositions, in favor of an increase in the alkali earth, calcium oxide, and by increasing the proportion of boron oxide which is substituted for the alkali oxide fluxes there was produced a glass having excellent properties of corrosion resistance. Then, by maintaining the boron oxide content above 9% and never allowing the aluminum oxide to be present in proportions greater than 18% it was found that the melting and fining and the viscosity-temperature relationship of the product was materially improved.

A typical glass composition within these ranges is formulated as follows:

Composition "A"

|  | Per cent |
|---|---|
| $SiO_2$ | 50 |
| $Al_2O_3$ | 16 |
| CaO | 22 |
| $B_2O_3$ | 12 |

Comparative corrosion tests were performed on sample fibers made from former borosilicate glass compositions such as "Composition I" set out above, and sample fibers made from my composition, as follows:

A sample of fiber was leached with water at 90° C. for four hours. The resulting water was then titrated and the leached alkali expressed as sodium oxide.

The results of a typical test show:

| Composition I | 0.112% $Na_2O$ |
|---|---|
| Composition "A" | 0.105% $Na_2O$ |

Thus it can be seen that the glass of my Composition "A" is equal to or slightly better than Composition I with respect to chemical durability.

Compounding successive batches of glass compositions, with the proportions of their constituents lying above, below and within the ranges of my composition, and testing the product for melting and fining properties, working temperature, corrosion resistance and the viscosity-temperature relationship revealed these ranges to be critical. For example, where the silica content was increased above 52% the ease with which the materials for the glass mixture went into solution decreased, producing a greater tendency toward the formation of scum on the molten glass. It was found that the proportion of aluminum oxide could be increased above 18% but this raised the working temperature range to a point to close to the melting temperature of the attenuating crucible. Similarly, when more than 14% of the fluxing component, boron oxide, is present resistance to corrosion is decreased, while lowering the content below 9% raises the working temperature and decreases the solubility of the other components.

The operating range of the glass for fiber production is the temperature range over which a fiber from the glass may be successfully attenuated; and it is, therefore closely related to the viscosity-temperature relationship. This range and the viscosity-temperature curve was determined for a number of glasses of previous compositions, as well as for glasses of my composition, and the results were compared.

Referring to the drawing, there is shown a graph in which viscosity in poises is plotted against temperature for a previous glass composition (in this instance, Composition II) and a glass composition of my invention (Composition "A"). It will be noted that the viscosity of Composition II decreases very sharply as the temperature is increased, while the viscosity of Composition "A" decreases sharply during the melting and fining state but levels off very favorably as the higher temperatures are reached. It is this tendency to slow down the rate of decrease in viscosity as the working temperature of the mass is reached which provides, as indicated, a wider operating range for a glass of my composition.

Thus it can be seen that I have provided a glass composition which has a viscosity-temperature relationship permitting fiber attenuation from the molten mass over a wider operating range, favoring lower temperatures; there has also been provided a glass composition capable of yielding fiber which has a resistance to corrosion equal to, or higher, than that of previous compositions.

From the foregoing it will be seen that my invention is well adapted to attain the ends and objects hereinbefore set forth together with other advantages which are obvious and which are inherent to the invention.

It will be understood that certain features and subcombinations are of utility and may be employed without reference to other features and subcombinations. This is contemplated by and is within the scope of the claims.

Inasmuch as many possible embodiments of the invention may be made without departing from the scope thereof, it is to be understood that all matter herein set forth is to be interpreted as illustrative and not in a limiting sense.

Having thus described my invention, I claim:

1. A glass composition for the production of fiber glass consisting of the following constituents in the proportions indicated:

|  | Per cent |
|---|---|
| $SiO_2$ | 46–52 |
| $Al_2O_3$ | 14–18 |
| CaO | 18–24 |
| $B_2O_3$ | 9–14 |

2. A glass composition for the production of fiber glass consisting of the following constituents in the proportions indicated:

| | Per cent |
|---|---|
| $SiO_2$ | 50 |
| $Al_2O_3$ | 16 |
| $CaO$ | 22 |
| $B_2O_3$ | 12 |

3. Glass fiber formed from glass consisting of

| | Per cent |
|---|---|
| $SiO_2$ | 46–52 |
| $Al_2O_3$ | 14–18 |
| $CaO$ | 18–24 |
| $B_2O_3$ | 9–14 |

4. Glass fiber formed from glass consisting of

| | Per cent |
|---|---|
| $SiO_2$ | 50 |
| $Al_2O_3$ | 16 |
| $CaO$ | 22 |
| $B_2O_3$ | 12 |

References Cited in the file of this patent

UNITED STATES PATENTS

| Number | Name | Date |
|---|---|---|
| 2,334,961 | Schoenlaub | Nov. 23, 1943 |
| 2,571,074 | Tiede et al. | Oct. 9, 1951 |

FOREIGN PATENTS

| Number | Country | Date |
|---|---|---|
| 520,247 | Great Britain | 1940 |